(12) United States Patent
Varale

(10) Patent No.: US 12,455,020 B2
(45) Date of Patent: Oct. 28, 2025

(54) SUPPORT COLLAR FOR ELONGATED CABLES, TUBES OR THE LIKE

(71) Applicant: Fi.Mo.Tec. S.p.A., Milan (IT)

(72) Inventor: Alberto Varale, Cologno Monzese (IT)

( * ) Notice: Subject to any disclaimer, the term of this patent is extended or adjusted under 35 U.S.C. 154(b) by 94 days.

(21) Appl. No.: 18/172,261

(22) Filed: Feb. 21, 2023

(65) Prior Publication Data

US 2023/0194022 A1    Jun. 22, 2023

Related U.S. Application Data

(63) Continuation-in-part of application No. 17/389,725, filed on Jul. 30, 2021, now abandoned.

(60) Provisional application No. 63/367,044, filed on Jun. 26, 2022.

(51) Int. Cl.
*F16L 3/10*  (2006.01)
*F16L 3/22*  (2006.01)
*F16L 3/237* (2006.01)
*H02G 3/04*  (2006.01)

(52) U.S. Cl.
CPC .............. *F16L 3/1058* (2013.01); *F16L 3/222* (2013.01); *F16L 3/237* (2013.01); *H02G 3/0456* (2013.01)

(58) Field of Classification Search
CPC ....... F16L 3/13; F16L 3/08; F16L 3/10; F16L 3/222; F16L 3/1058; F16L 3/237; H02G 3/0456; H02G 3/32; F16B 2/20; F16B 2/22

USPC ... 248/47–74.5, 174, 247, 300, 316.1–316.7; 24/530–531, 555, 563

See application file for complete search history.

(56) References Cited

U.S. PATENT DOCUMENTS

| | | | | |
|---|---|---|---|---|
| 2,371,109 A * | 3/1945 | Sanford | ................. | A47K 10/22 |
| | | | | 242/596.7 |
| 3,584,348 A * | 6/1971 | Soltysik | ................. | F16L 3/237 |
| | | | | 248/68.1 |
| 4,441,684 A * | 4/1984 | Credle, Jr. | ............. | F16M 13/02 |
| | | | | 248/300 |
| 2005/0109887 A1* | 5/2005 | Catapano | ................. | H02G 3/30 |
| | | | | 248/68.1 |
| 2011/0226913 A1* | 9/2011 | Feige | ........................ | F16L 3/13 |
| | | | | 248/74.2 |
| 2015/0121676 A1* | 5/2015 | Feige | .................... | F16L 55/035 |
| | | | | 248/614 |
| 2020/0041039 A1* | 2/2020 | Varale | ..................... | F16L 3/222 |
| 2020/0099212 A1* | 3/2020 | Bell | ....................... | H02G 7/053 |
| 2020/0109800 A1* | 4/2020 | Bell | ....................... | F16L 3/1058 |

* cited by examiner

*Primary Examiner* — Christopher Garft
(74) *Attorney, Agent, or Firm* — Themis Law

(57) ABSTRACT

A support collar for elongated bodies includes a frame and retaining arms extending from the frame toward the interior the frame. A rib is defined at least partly around the attachment edge of the retaining arms to the frame and along at least a portion of the retaining arms.

14 Claims, 13 Drawing Sheets

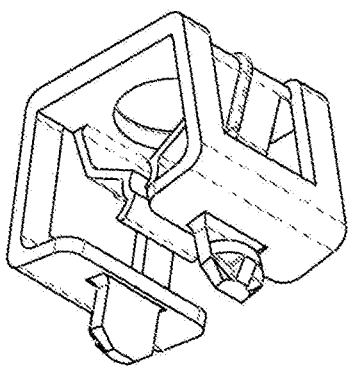 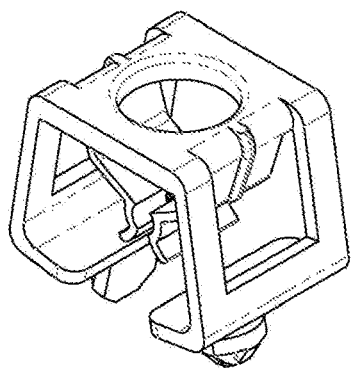
FIG. 17A FIG. 17B
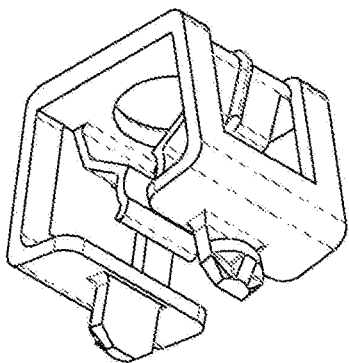 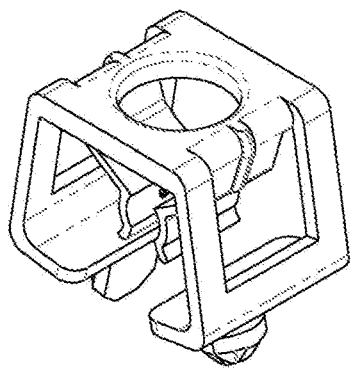
FIG. 17C FIG. 17D
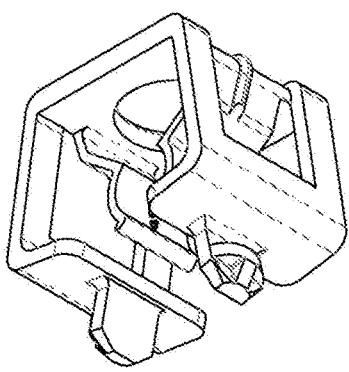 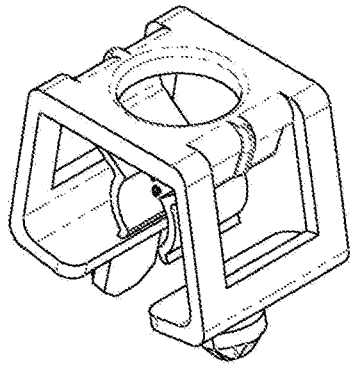
FIG. 17E FIG. 17F
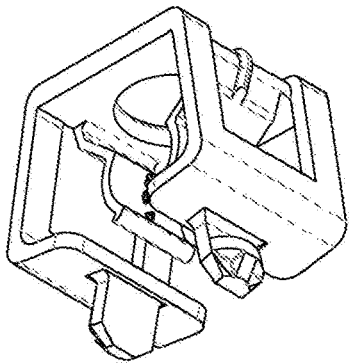 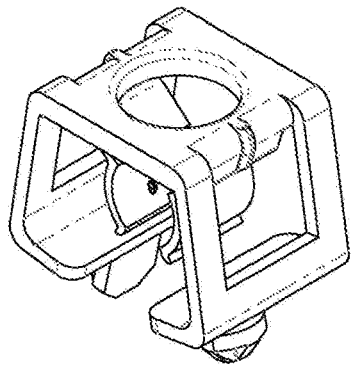
FIG. 17G FIG. 17H

SUPPORT COLLAR FOR ELONGATED CABLES, TUBES OR THE LIKE

FIELD OF THE INVENTION

The present invention relates to a support collar for holding elongated bodies such as cables or tubes firmly in place. More particularly, the present invention relates to a support collar that can hold an elongated body with the grip that is independent of the pressure applied by external forces on the outer frame of the support collar; that mitigates the effects of PIM (Passive Inter-Modulation) in cellular phone towers; and that can produced with a lower height and a simpler structure than support collars in the prior art.

BACKGROUND OF THE INVENTION

Cables and tubes used in the telecommunication and building sectors may be supported using one or more support collars that are engaged to perforated plates.

Such support collars generally include a relatively elastic structure that can be splayed to be rapidly fitted onto the cable or tube to be supported.

EP 2464907 discloses a support collar according to the prior art that is made of a laminar structure and that has a head portion with a central opening; two side portions extending transversely from the head portion, each having a coupling portion configured to engage the support collar on a support plate or a head portion of another support collar, and a retaining clip that receives an elongated body within an area defined by the head portion and the two side portions. The retaining clip is derived from the structure of a respective side portion of the collar.

This construction provides for saving on the material used for producing the support collars, but at the same time the shape and dimensions of the arms of the clip are constrained by those of the side portions.

The elasticity of the retaining arms of the clip, together with the presence of side portions without structural folds, provides for an elastic yield that makes the support collar easily adaptable to different geometries and dimensions of cables or tubes.

At the same time, a person of skill in the art will readily recognize that the collar described in EP 2464907 cannot be adapted to support cables or tubes having an extremely reduced diameter unless sleeves are used.

The negative impact of PIM on the infrastructure of mobile radio networks is also known in the art. PIM takes place when different radiofrequency signals, coming from one to several radio base stations, mix together in a site that houses a cell and generate a signal that contains a new set of frequencies.

Undesired signals due to PIM are caused by mechanical non-linearity. One of the major causes is the inconsistency of the metal-to-metal contacts in areas affected by high current intensities, such as those inside the transmission lines or within radiofrequency (RF) components. This may be due to an imperfect preparation of the RF terminations or non-optimal assembly procedures, loosening of screws or rivets inside the RF components, contaminated or oxidized surfaces of the connectors, or RF connectors that are not properly tightened.

PIM may degrade the quality of service of new networks considerably, for example in \ LTE (Long Term Evolution) and HSPA+ (Evolved High Speed Packet Access) networks. It is of primary importance for telecommunications operators to reduce the negative effects of PIM in order to be able to install more advanced network infrastructures capable of supporting the transmission of broadband data, without a significant increase in costs and without jeopardizing the performance level.

IT 102019000008184 discloses a collar made in a plastic material that holds a cable or a tube in a stable manner.

SUMMARY OF THE INVENTION

An objective of the present invention is to provide a support collar for elongated bodies such as cables or tubes that overcomes the above-described drawbacks and that facilitates the engagement and grip on an elongated body housed in the support collar.

In particular, an objective of the present invention is to provide a support collar having an elastically deformable structure that is adapted for supporting cables of different geometries and sections, such as cables having cross-sections that vary from narrow to wide, and for facilitating the insertion of the cables into the support collar regardless of their diameter.

In one embodiment, a support collar according to the invention includes a frame having a head portion with an opening therethrough; side portions that extend downwardly from the head portion; and abutment portions that extend transversely, for example perpendicularly, from the side portions. The head portion, the plurality of side portions, and the plurality of abutment portions define a housing area within the frame.

The side portions are flexibly connected to the head portion, which makes them rotatable in relation to the head portion to approach or spread away from each other. A plurality of coupling portions extend downwardly from the abutment portions and are configured to engage the support collar to a support plate or to a head portion of an additional support collar.

Retaining means are disposed inside the housing area and are configured to retain the elongated body. The retaining means include a clip having retaining arms that extend from the frame into the housing area and that are flexibly connected to the frame to spread for receiving the elongated body within the housing area, and to reapproach for holding the elongated body in place within the housing area.

Each of the retaining arms includes a first segment that extends from the frame into the housing area and that is substantially V-shaped; a second segment that extends from the first segment and that defines a concavity facing a central portion of the housing area, so that opposing second segments can define a seat for receiving the elongated body; and a third segment that extends from the second segment away from the central portion of the housing area and that is shaped as a winglet of rectilinear or arched shape for facilitating the entry of the elongated body into the seat defined by the opposing second segments. The retaining arms are connected to the head portion of the support collar by an attachment edge.

A rib extends longitudinally around at least part of the attachment edge of the first segment to the frame and along at least a portion of the retaining arms. In different embodiments, the rib extends around at least part of the attachment edge and along at least a portion of the first segment, or around at least part of the attachment edge and along a branch of the V-shape defined by the first segment.

The attachment edges of the retaining arms may be thicker than a portion of the first segment where no rib is present. Alternatively, an edge of the frame, from a portion of which the first segment extends, may be thicker than a portion of the first segment where no rib is present.

In one embodiment, the head portion is thicker than the side portions and/or the abutment portions of the frame of the support collar. Alternatively, a lip may extend from the head portion, in order to provide an increased contact area between the head portion and the coupling portions of the additional support collar.

In one embodiment, the side portions of the frame may be planar in shape and may have windows, each of which is at least as wide as each of the retaining arms. A gap may be defined perpendicularly between a side edge of each window and a side edge of an adjacent first segment, but in a different embodiment, no perpendicular gap may be defined between a side edge of each window and an adjacent side edge of the first segment.

The branches of the V-shape defined by the first segment of the retaining arms may be spread by no more than 120 degrees, so as to provide a support collar of reduced height and decrease the wind impact on a support collar or a plurality of stacked collars.

One or more retaining blades may extend from each concavity defined by the second segment of the retaining arms, in order to increase the grip on an elongated body housed therein.

A support collar according to the invention may be made from a variety of materials. In one embodiment, the support collar is made from a plastic material, which reduces the PIM effect on the support collar.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIGS. 15 to 17H are perspective views of support collars constructed according to the principles of the embodiment depicted in FIGS. 11A and 11B.

DETAILED DESCRIPTION OF EMBODIMENTS OF THE INVENTION

Figure 1:
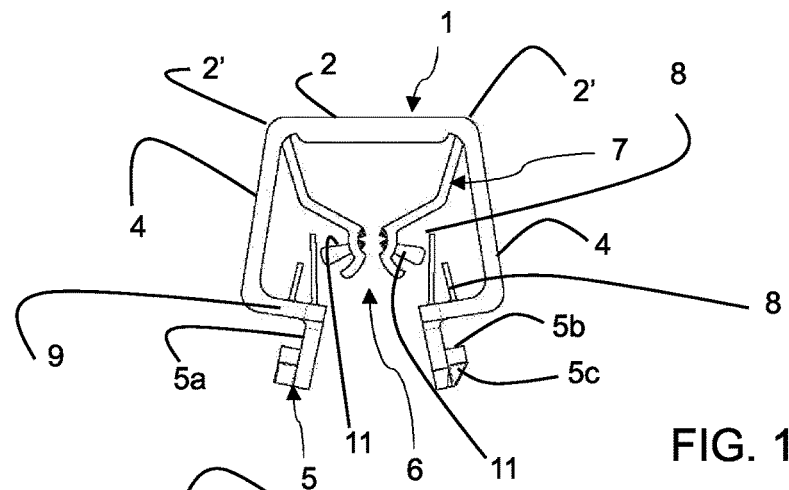
FIG. 1 is a front view of an embodiment of a support collar for elongated bodies according to the invention, partly splayed, with contact elements extending from the retaining arms and flaps extending into the housing area.

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

With reference to the figures, a support collar for elongated bodies such as cables, tubes or similar elements is referenced as a whole with 1.

Support collar 1 may be made of a plastic material, which may be thermoplastic or thermoset, reinforced or not. In other embodiments, however, support collar 1 may be made of different materials, such as metal.

Preferably, the plastic material is flexible and elastic, and has high mechanical properties.

In one embodiment, support collar 1 includes:
a head portion 2 having a pass-through opening 3;
two side portions 4 extending transversely and, in the present embodiment, substantially perpendicularly from head portion 2, and ending with respective abutment portions 9 positioned to be substantially parallel to head portion 2 when support collar 1 is in engaged condition;
coupling portions 5 provided for each of abutment portions 9 and configured to engage support collar 1 on a support plate 15 or a head portion of another support collar, with side portions 4, abutment portions 9 and head portion 2 of support collar 1 delimiting a housing area 6 for a partial housing of a cable or tube C to be supported; and
retaining means within housing area 6 for engaging a cable or tube C firmly therein.

The retaining means include a clip 7 having retaining arms 7', which extend inside housing area 6.

Retaining arms 7' of clip 7 are flexibly connected to at least one of portions 2, 4, 9 of support collar 1 and can be elastically spread to engage cable or tube C, so as to hold it within housing area 6 by applying a transverse elastic pressure upon a longitudinal development of cable or tube C.

Support collar 1 further includes at least one flap 8 that is configured to cooperate with each of retaining arms 7' and that extends inwardly into housing area 6 from the surface of each abutment portion 9 facing housing area 6. The at least one flap 8 is positioned opposite to retaining arms 7', so that the at least one flap 8 is abutted against a retaining arm 7' when cable or tube C is engaged in clip 7.

Opening 3 has a circular shape in the present embodiment but may have any shape, for example and without limitation, may be oblong, square, or elliptical.

Furthermore, opening 3, according to an embodiment that is not shown, can be surrounded by a reinforcement collar.

Head portion 2, side portions 4 and abutment portions 9 preferably have a substantially flat development. In other embodiments, however, they may be curved or include curved portions.

By having coupling portion 5, each abutment portion 9 of support collar 1 can be arranged against a corresponding surface of support plate 15 or the head portion of another support collar.

Side portions 4 extend perpendicularly, or obliquely, or anyway transversely, with respect to head portion 2 to define an angled, inverted U-shaped open profile.

In one embodiment, each of side portions 4 may have a window 4' so that the side portion defines a frame, giving collar 1, in particular side portions 4, a degree of lightness and elastic yield along directions transverse to side portions 4.

Figure 10:
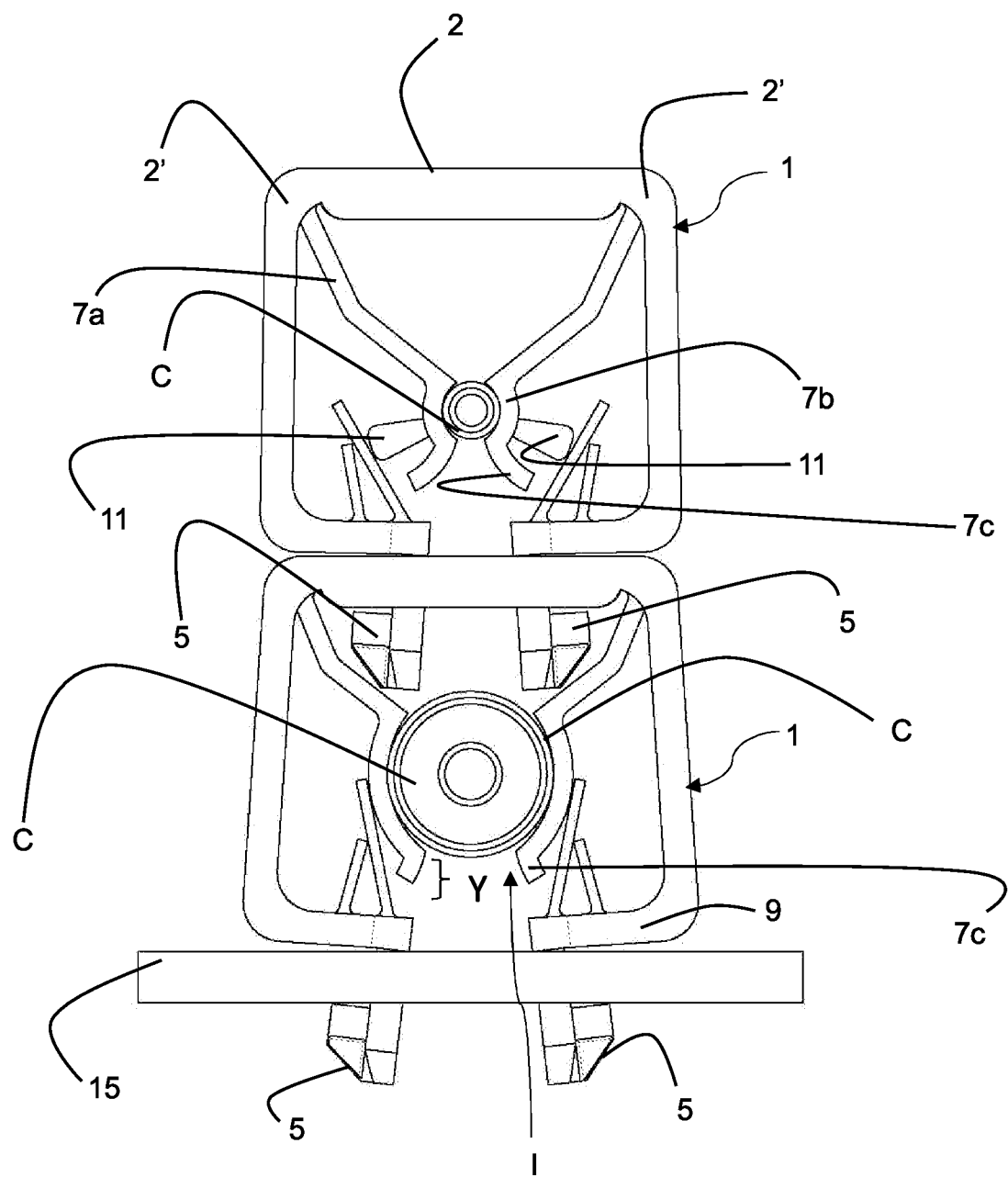
FIG. 10 is a front view of two support collars according to FIG. 9, stacked on top of each other and engaged on a support plate.

The figures, for example in FIG. 10, show side portions 4, abutment portions 9 and head portion 2 of support collar 1 delimiting housing area 6 for a partial housing of an electric cable, a conduit, a tube, a bar or similar objects having an elongated shape C.

The figures further show the retaining means, which in the present embodiment include clip 7, arms 7', and flaps 8 provided within housing area 6, in order to keep cable or tube C in a stable position.

As also shown in the figures, retaining arms 7' may be flexibly extending from a corresponding attachment edge 2' of head portion 2 and at least one flap 8 may extend from a surface of opposite abutment portions 9 that face housing area 6 toward head portion 2.

In particular, each of retaining arms 7' may cooperate with at least one flap 8 that extends obliquely from the surface of abutment portions 9 facing housing area 6 toward a corresponding side portion 4.

The at least one flap 8 may bend slightly toward a corresponding side portion 4, when it is abutted or in direct or is indirect contact via a contact element 11 with the corresponding retaining arm 7', as described hereunder, when cable or tube C is inserted between retaining arms 7'.

Retaining arms 7' can be elastically splayed to receive and hold cable or tube C by transversely exerting on cable or tube C, in combination with flaps 8, a pressure sufficient for keeping cable or tube C in a stable position, whatever the diameter of cable or tube C may be.

By cooperating with the respective flap or flaps 8, retaining arms 7' transversely constrain the cable or tube C to the support collar 1, thus facilitating the assembly of cables or tubes C by operators.

In an embodiment that is not illustrated, cable or tube C may be held by retaining arms 7' that extend from respective edges 2" positioned on the opposite side of the head portion 2, in correspondence with coupling portions 5. Retaining the arms 7', cooperating with flaps 8, are provided on head portion 2, laterally with respect to the pass-through opening 3, and extend inside the housing area 6.

Retaining arms 7' may also extend inside housing area 6 starting directly from side portions 4 or from head portion 2, adjacently to opening 3. In other embodiments, retaining arms 7' may extend from different portions of support collar 1 and the at least one flap 8 would then be positioned to abut against ends of retaining arms 7'.

With reference now to retaining means 7, each retaining arm 7' comprises a first substantially V-shaped segment 7a that extends from a respective attachment edge 2' of support collar 1 toward the center of housing area 6.

The advantage of the V-shape of first segment 7a is that it provides for space to insert, through opening 3, a coupling portion 5 of another support collar, which can be stacked onto the support collar located underneath it.

A second curved segment 7b develops from first segment 7a and has a concavity directed toward the center of housing area 6, which provides for a suitable resting surface for the outer surface of cable or tube C to be supported.

As clearly shown in the figures, particularly FIG. 10, having the above-described shape of retaining arms 7', that is, having second segment 7b depart from the free end of first segment 7a, with no other segments extending into housing area 6 toward opening 3, facilitates, for collars 1 adapted for high diameter cables, the insertion of the coupling portions of a second collar into opening 3, considering that any interference is prevented between retaining arms 7' of a support collar 1 and coupling portion 5 of a second support collar stacked on top of first support collar 1.

In known collar embodiments such as those described in IT 102019000008184, the third segments of the retaining arms, which develop in opposite directions compared to the second elements, may interfere with the coupling portions of the second collar, stacked on top of the first support collar, which are inserted into the opening of the first support collar, with the risk of an accidental disengagement of the two collars, an unstable hold, or even being unable to lock the two support collars to each other in case of support collars for large cables.

The present invention provides a solution to these drawbacks of the prior art.

According to the present invention, each retaining arm 7' includes a third segment 7c that extends from the free end of second segment 7b, which is arched and extends in a direction opposite to first segment 7a, each third segment 7c being shaped as an angled or arched winglet toward a corresponding side portion 4 and/or toward the at least one flap 8, so as to facilitate the entry of cable or tube C between second segments 7b of retaining arms 7' of clip 7.

Third segment 7c may be arched, in the shape of a boat, or straight and angled toward the corresponding side portion 4 of support collar 1.

From second segment 7b, in the direction of each abutment portion 9, third segment 7c extends and may be:

shaped as a curved, or folded, element or fin, having free extremities that face side portions 4 and/or the at least one flap 8, or shaped as a flat and angled element or fin, with free extremities that face side portions 4 and/or the at least one flap 8, so as to facilitate the housing and engagement of cable or tube C between second segments 7b of retaining arms 7' of clip 7.

As shown in the figures, each third segment 7c has a free end facing the respective abutment portion in the direction of edge 2" that it forms with the corresponding side portion 4.

This pair of third segments 7c, placed near the entrance of housing area 6, facilitates the positioning of cable or tube C and creates an easier path or an entry point into opening I.

Third segments 7c have sizes that prevent an interference with flaps 8 even when the cable or tube C is inserted between two second segments 7b of retaining arms 7' of clip 7.

The transverse extension, that is, the extension toward side portions 4 and/or toward the at least one flap 8, or the width Y of each third segment 7c is inversely proportional to the size of second segments 7b.

As it can be seen, in particular, in FIGS. 1 to 4, which depict different dimensions of second segments 7b for cables C according to cable diameter, the width Y of third segments 7c is variable, preferably larger in support collars 1 adapted to house cables of reduced diameters (for example, fiber optic cables). This provides for a wider entry point (as third segments 7c are angled or arched toward the outside, that is, toward side portions 4) for cables of reduced diameters.

As shown in FIG. 1, the absence of third segments 7c would make it extremely difficult to insert cable C between second segments 7b located in housing area 6, because the entry opening in clip 7 would be extremely small compared to the overall size of support collar 1.

Figure 4:
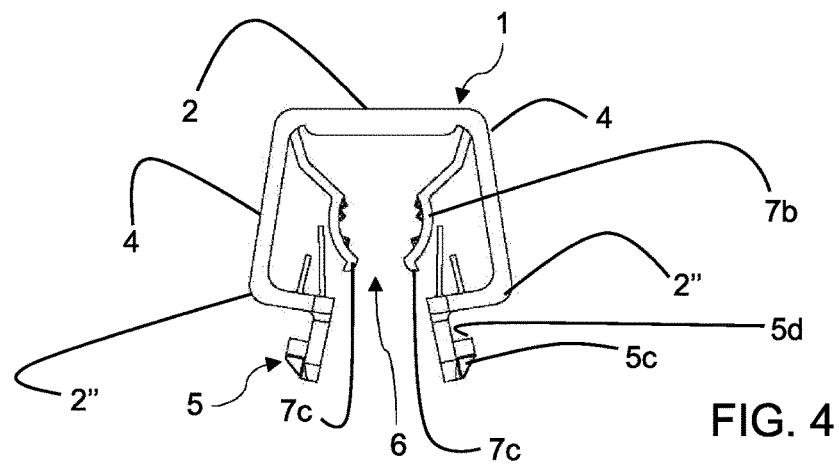
FIG. 4 is a front view of a support collar according to the invention for housing elongated bodies having a larger diameter than in the support collars of FIG. 1, 2 or 3, without contact elements protruding from the retaining arms.
Figure 5:
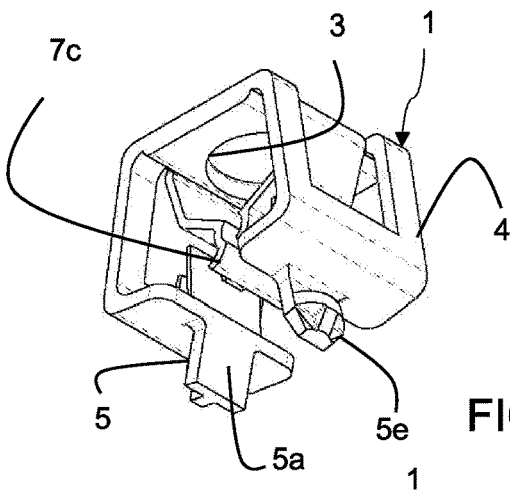
FIGS. 5 to 8A are perspective views of a support collar according to the invention constructed similarly to the collar of FIG. 4.
Figure 5A:
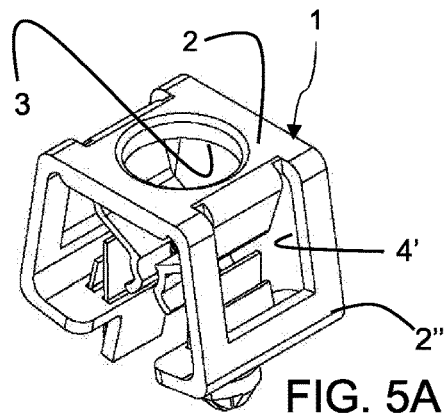
Figure 6:
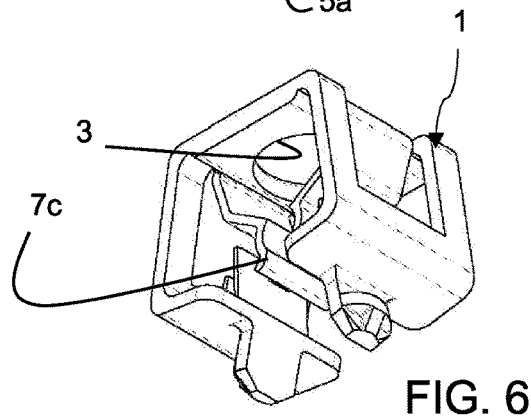
Figure 6A:
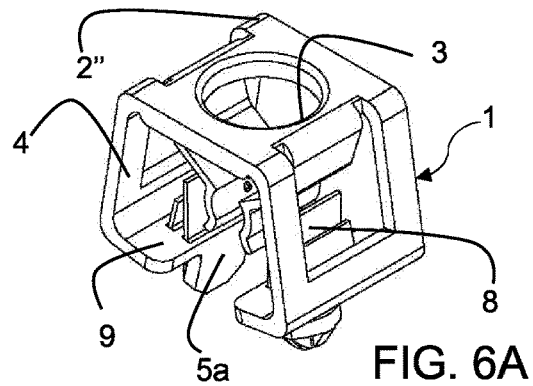
Figure 7:
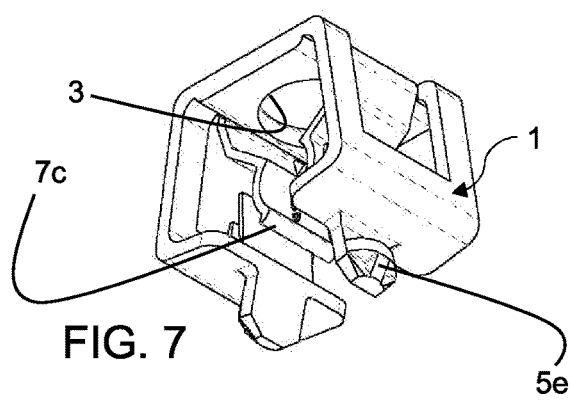
Figure 7A:
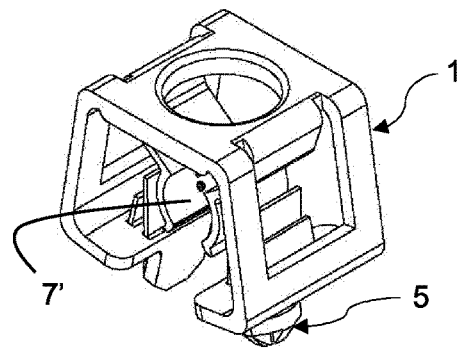
Figure 8:
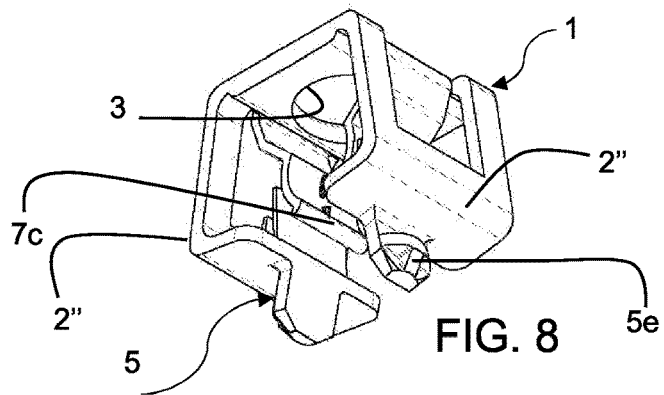
Figure 8A:
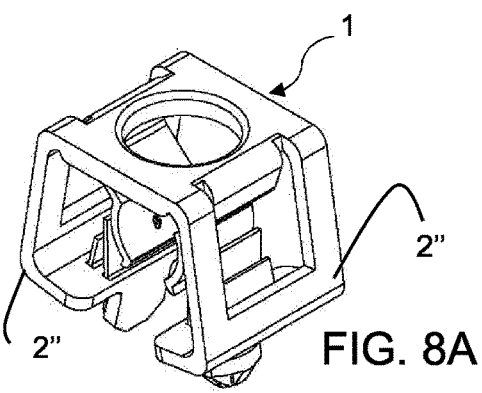

On the contrary, as it can be seen in FIG. 4, in support collars 1 adapted to house cables C of large diameter, the width Y of third segments 7c is reduced, so that, when cable C is inserted into clip 7, any interference between third segments 7c and flaps 8 is prevented.

To improve the grip of retaining arms 7', the arched surfaces of second segments 7b facing the center of housing area 6 and intended to come into contact with the outer surface of cable or tube C to be supported, may have one or more teeth, dowels, or retaining blades 10 in order to improve the grip that retaining arms 7' have on cable or tube C.

As it can be seen from the figures, second segments 7b may have different sizes and curvatures to adapt to the dimensions of cable or tube C to be supported.

In particular, the second segments 7b may vary depending on the diameter of cable or tube C. Third segments 7c can also be of different sizes, in particular, have a width Y that increases as the sizes of segments 7b decrease, so as to facilitate the insertion of cable or tube C by creating an opening that is easier to access, that is, by increasing the size of the entry opening between second segments 7b of clip 7.

As shown in the figures, second segment 7b of the arm 7' of each side portion 4, in particular, its surface opposite to the surface facing housing area 6 and, therefore, its surface opposed to the surface in contact with cable or tube C, cooperates with at least one flap 8 disposed on each abutment portion 9 and facing housing area 6. The at least one flap 8 ensures that cable or tube C is stable and safely positioned between arms 7' of retaining means 7 when support collar 1 is engaged to support plate 15 or to an additional support collar 1. When cable or tube C is placed between retaining arms 7' of retaining means 7, retaining arms 7', being elastically movable, receive cable or tube C between second segments 7b, and move to rest on the surface of at least one flaps 8, which, by being also elastically movable, provides an elastic resistance to an additional and undesired spreading of retaining arms 7' and a stable hold of cable or tube C in housing area 6 of support collar 1. In particular, the outer surface of retaining arms 7' facing side portions 4, at second segment 7b, enters into contact, directly or indirectly, with the surface of at least one flap 8. Each of abutment portions 9 may have one or more flaps 8.

Preferably, two flaps 8 may be provided, disposed parallel to each other, for each abutment portion 9, whereas the second flap 8 of each abutment portion 9 increases the elastic resistance offered to the spreading of arms 7' whenever cable or tube C is placed within retaining means 7.

As shown in the figures, in order to insure the contact between retaining arms 7', in particular between second segments 7b and at least one flap 8, there may be provided, on the outer surface of each second segment 7b of retaining arms 7', that is, on the surface of second segments 7b facing each side portion 4, at least one contact element 11, shaped as a tooth or similar, so as to ensure a direct or indirect contact between flaps 8 and arms 7' even when cable or tube C has a reduced diameter and, therefore, retaining means 7, being also of reduced dimensions, are located centrally in housing area 6, occupying a small area within housing area 6 and, therefore, being further spaced from flaps 8.

Figure 2:
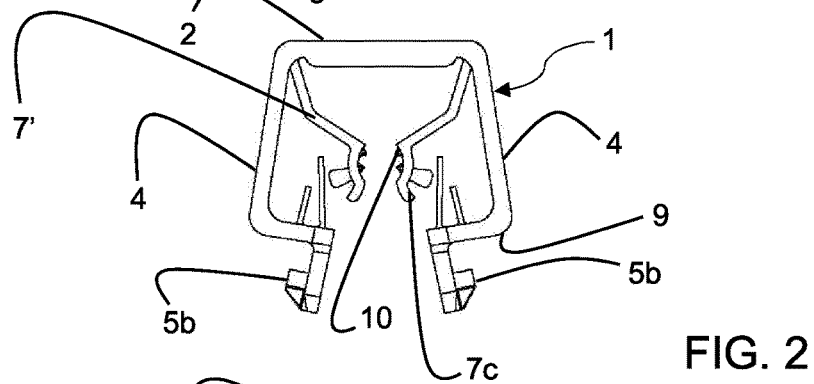
FIG. 2 is a front view of a support collar according to the invention for housing elongated bodies having a larger diameter than in the support collar of FIG. 1.
Figure 3:
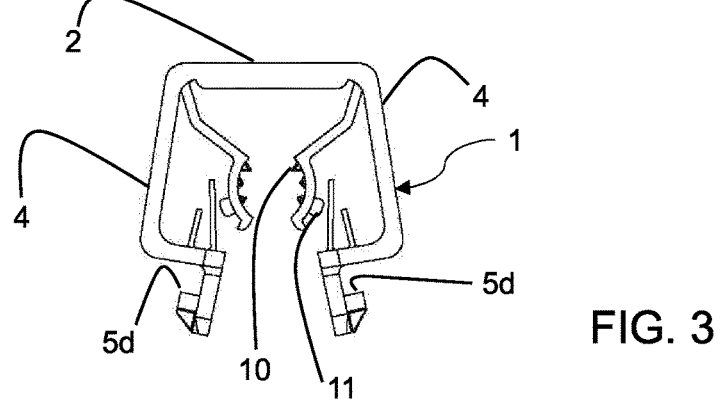
FIG. 3 is a front view of a support collar according to the invention for housing elongated bodies having a larger diameter than in the support collars of FIG. 1 or 2.

As further shown in the figures, for example in FIGS. 1-3, contact element 11 is located on second segment 7b of each arm 7, above the connection point between second segment 7b and third segment 7c.

In the present embodiment, contact element 11 is located on second segment 7b, between first segment 7a and third segment 7c.

In particular, contact element 11 is located on second segment, 7b, above third segment 7c.

Preferably, in order to facilitate the contact between contact element 11, shaped as a tooth or similar, of each arm 7', and a respective flap 8, contact element 11 is located on second segment 7b, between first segment 7a and third segment 7c.

This position of contact elements 11 provides for a higher point of contact with flaps 8, that is, at the free section of a flap 8, which is opposite to the extremity fixed to abutment portion 9 and has the highest degree of flexibility and/or elasticity. Therefore, flaps 8 can bend more easily after inserting cable or tube C, especially when a pair of flaps 8 for each abutment portion 9 is provided, in the area in which there is no interference with outermost flaps 8.

Moreover, because contact elements 11 are not present on the free extremities of second segments 7b but only on its outer surface, a couple of third segments 7c may be provided at the free extremities of second segments 7b, creating a channel that facilitates the insertion of cable or tube C, considering that third segments 7c are curved toward the inside, or straight but angled toward the inside, that is, toward side portions 4 of support collar 1 in order to create an upside-down V-shaped entrance and to facilitate the receiving of cable or tube C, with the aim of "guiding" the cable during insertion into the seat defined within retaining means 7.

These features make it easier to install cables, tubes, or other elongated elements, especially when inserting the elongated element into its seat within clip 7.

Therefore, second segments 7b that receive cable or tube C, being linked to the free ends of first segments 7a, which are substantially V-shaped, make the engagement of additional collars safer, avoiding the interference between arms 7' of a first support collar 1 and the coupling portion 5 of a second support collar located above support collar 1.

As shown in the figures, the retaining function of cable or tube C performed by retaining means 7 is independent and unrelated to the locking function of support collar 1 to support plate 15 or to another support collar.

Retaining arms 7' ensure that support collar 1 engages cable or tube C independently from the locking of support collar 1 to another support collar or to plate 15.

This provides the advantage of making it easier for operators to assemble cables.

Coupling portion 5 of each side portion 4 of support collar 1 extends, outside of housing area 6, from the surface of a respective abutment portion 9, which in turn extends substantially parallel to head portion 2 with a substantially flat development to ensure a stable support for support collar 1 on plate 15 or on the head portion of another support collar.

Locking element 5 enables the fixing of support collar 1 onto another support collar or onto a plate 15.

Referring to FIGS. 1-4, each coupling portion 5 comprises a small plate 5a extending transversely, perpendicular to the surface of abutment portion 9, on the opposite side relative to head portion 2. On the surface of plate 5a, a wedge-shaped element 5b is provided, with a rounded profile and an inclined surface 5c in relation to plate 5a to facilitate the introduction of coupling portion 5 into the opening in the head portion of a second support collar or in an opening in plate 15.

Figure 9B:
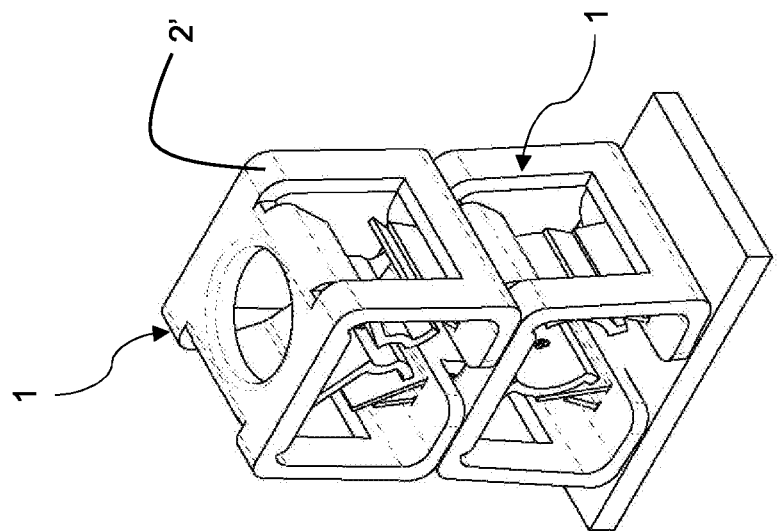
FIGS. 9A and 9B are perspective views of the stacked collars of FIG. 9.
Figure 9A:
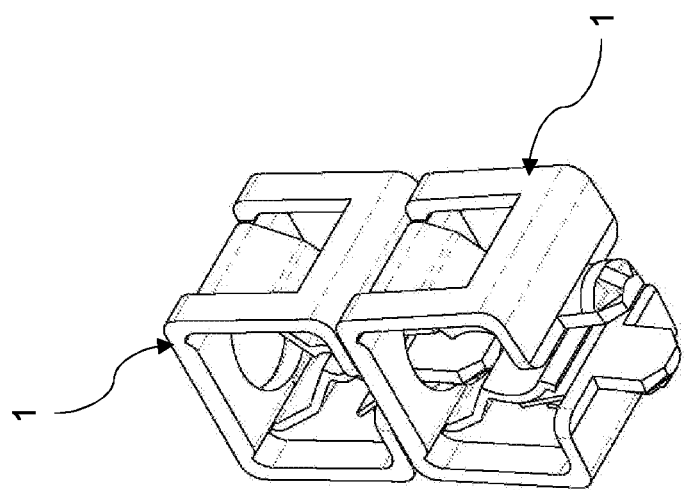
Figure 9:
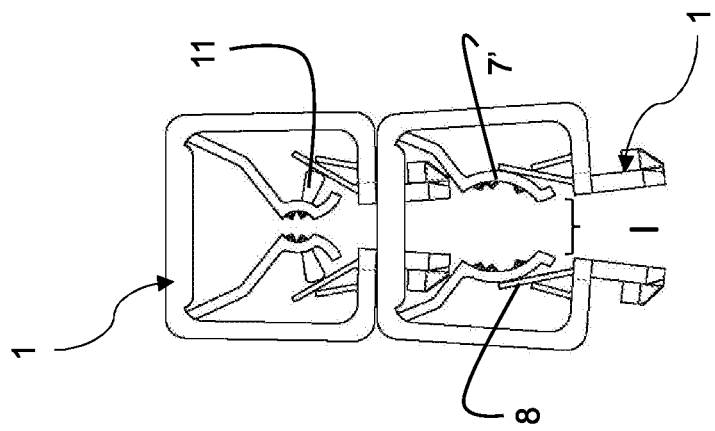
FIG. 9 is a front view of two stacked support collars constructed respectively according to the embodiments of FIGS. 1 and 4.

Wedge-shaped element 5b has an abutment surface 5d, which is substantially parallel to the surface of abutment portion 9 that becomes positioned on the surface of a second collar, as illustrated in FIG. 9, or against the surface of plate 15, as illustrated FIG. 10.

In a different embodiment illustrated in FIGS. 5-8A, a T-shaped element 5e is provided on the surface of plate 5a, with a head portion having a rounded profile and an elongated portion having an inclined surface serving the same purpose as the above-described wedge-shaped element 5b, which provides the advantages of further lightening the structure of support collar 1 and generating a reduction in the amount of the material required for manufacture.

In different embodiment, coupling portion 5 may have different shapes, for example, may be configured as having two wedge-shaped elements arranged on the sides of the corresponding plate 5a.

The present embodiment provides for a support collar for cables and other tubular elements that is inexpensive, light, and easy to manufacture, and that solves the issue of PIM, thereby facilitating a stable and safe insertion and the engagement of cables.

Moreover, due to the elasticity of the material used for manufacturing and to having retaining arms 7' that cooperate with the one or more flaps 8, a stable support of cable or tube C is generated, thereby facilitating the positioning of support collar 1 on the target structure.

The above-described structure of the support collar 1 further provides the manufacturing advantage of producing a part of support collar 1 that is identical for all cables or tubes C to be engaged, regardless of their diameter. That is because the same structure surrounds housing area 6, namely, head portion 2, side portions 4, abutment portions 9, coupling portions 5, and flaps 8. The only part that is molded with different shapes, depending on the diameter of the cable to be supported, is retaining means 7, which comprise retaining arms 7' and any contact elements 11 provided on retaining arms 7' to ensure contact between retaining arms 7' and flaps 8 even when retaining arms 7' are of reduced dimensions and are positioned in housing area 6 so spaced from flaps 8 that a stop contact is prevented even when cable or tube C is inserted.

Contact elements 11 provide a solution to this problem.

When support collar 1 is made from a plastic material, this structure also makes it possible, during the molding of support collar 1, to produce flaps 8 arranged within the housing area with the same degree of inclination, with no need to change orientation depending on the diameter of cable or tube C.

A support collar according to the present invention is extremely versatile, unlike the support collars disclosed in the prior art, which are made from a metal sheet and are not usable for all cables, particularly not for small diameter cables without using a sleeve or similar device to increase the diameter of the cable, because the retaining arms, generated from metal sheets, are not long enough to wrap the cable. In a support collar according to the present embodiment, instead, the combination of flaps 8 and retaining arms 7', and the potential addition of contact elements 11 and/or teeth, dowels, or retaining blades 10, makes it possible to engage and retain firmly cables of different diameters.

Figure 11A:
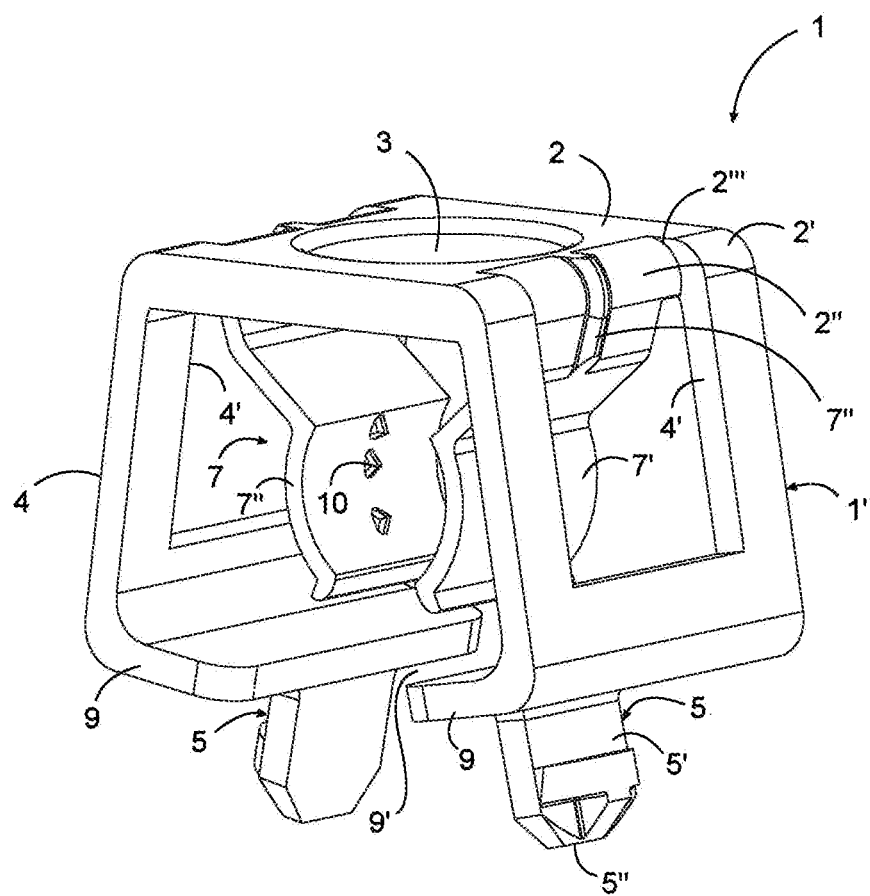
FIGS. 11A and 11B are perspective view of another embodiment of a support collar according to the invention having ribs along at least part of the retaining arms and no flaps.
Figure 11B:
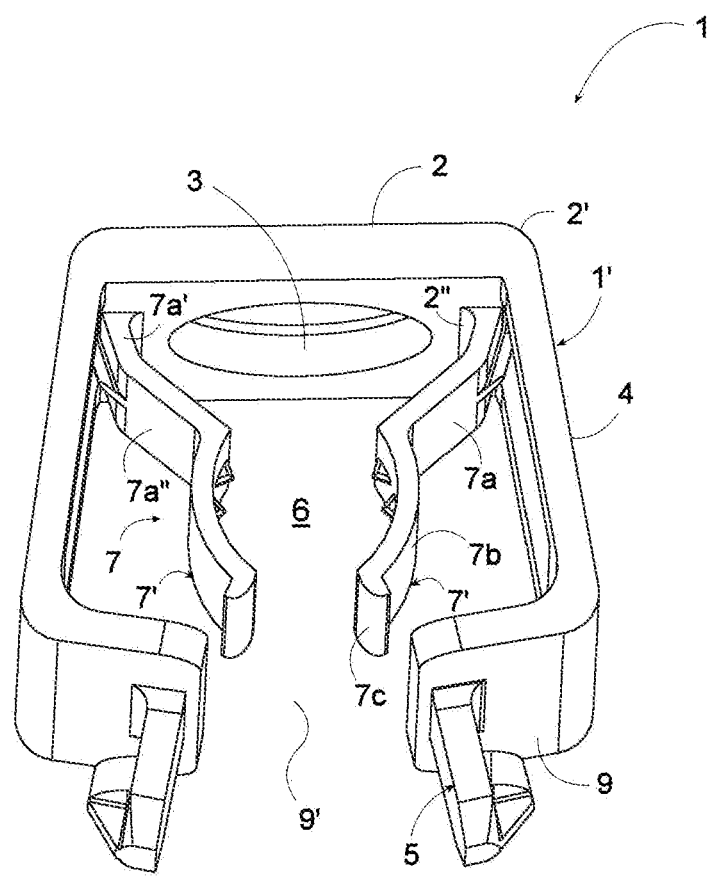

FIGS. 11A and 11B depict another embodiment of a support collar for elongated bodies according to the invention. This embodiment may also be used to support, for example, cables in cellular towers.

The basic components of a support collar 1 constructed according to the present embodiment are similar to those of the previously described embodiments and include a frame 1' defined by a head portion 2, side portions 4, and abutments portions 9.

Side portions 4 extend downwardly from head portion 2 and are flexibly connected to head portion 2, so as to be rotatable in relation to head portion 2 and to approach or spread away from each other, generating a gap 9' between abutment portions 9 to be closed, opened, narrowed, or widened as desired.

Each of abutment portions 9 extends transversely from one of side portions 4, preferably perpendicularly, and carries a coupling portion 5, preferably at an end that is opposite to the attachment edge of coupling portion 5 with a respective side portion 4.

Figure 12:
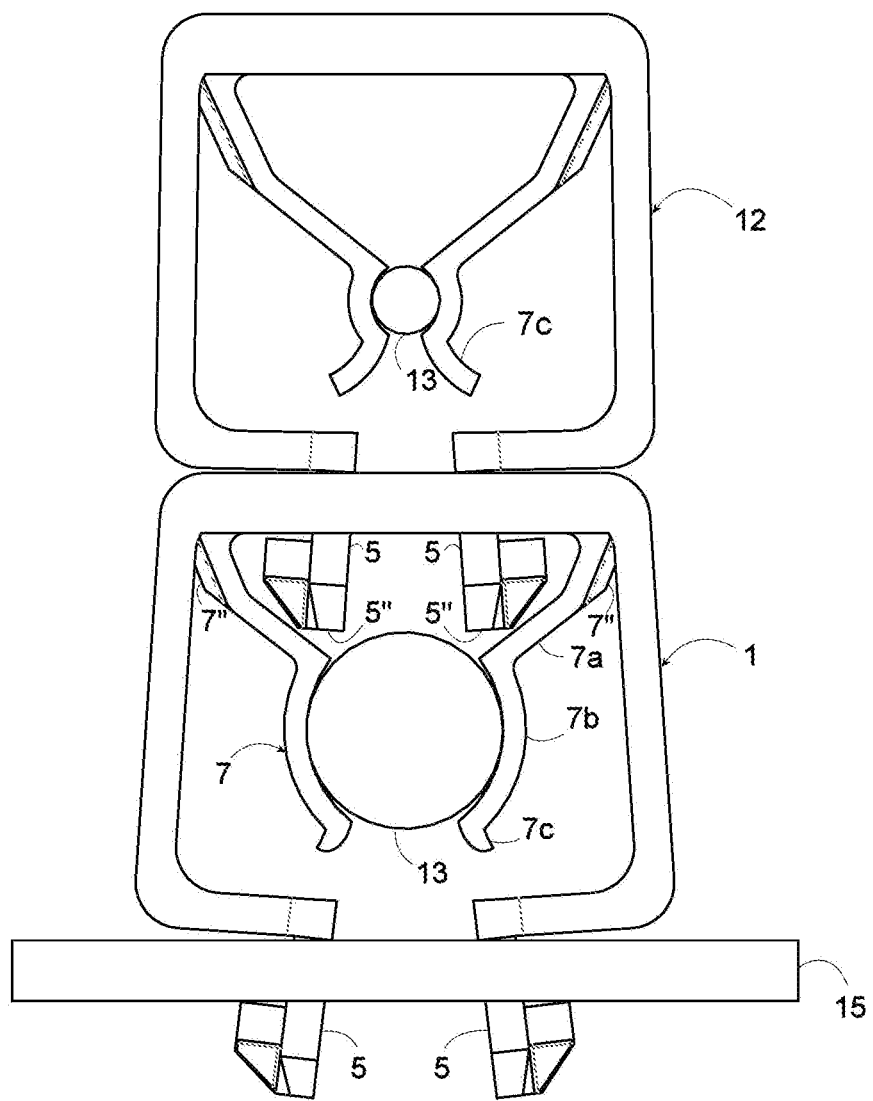
FIG. 12 is a front view of two support collars according to FIGS. 11A and 11B, stacked on top of each other and engaged to a support plate.

Coupling portions 5 extend downwardly from abutment portions 9 and are configured to engage support collar 1 to an underlying support plate 15, as shown in FIG. 12, or to enable the stacking of support collar 1 and a second support collar 12, also as shown in FIG. 12. Coupling portions 5 may be configured like the coupling portions in the previously described embodiments but a person of skill in the art will appreciate that different configurations of coupling portions may be possible for engaging support collar 1 to a second support collar 12 or to an underlying support plate 15.

Head portion 2 is preferably plate-shaped in order to facilitate the stacking of a plurality of support collars and may be of different thicknesses. An opening 3 is defined in head portion 2 and extends through the entire thickness of head portion 2, so as to provide an anchoring point for second support collar 12. In alternative embodiments, however, head portion 2 may have a different shape, for example, may be curved or have curved portions.

In one embodiment, head portion 2 has a higher thickness than side portions 4 and/or abutment portions 9, so that the wall of opening 3 may engage all or a portion of anchoring seat 5' defined in coupling portion 5. In another embodiment, however, head portion 2 may have the same thickness as, or a lower thickness than, side portions 4 and/or abutment portions 9, and a lip 13 may extend downwardly from opening 3 to increase the engagement surface of opening 3 with anchoring seat 5'. Having head portion 2 with an increased thickness provides for a stronger structure of support collar 1 and for a stronger support base when second support collar 12 is stacked on support collar 1. In addition, a thicker head portion 2 provides for stronger attachment lines 2", as discussed in greater detail later.

While FIGS. 11A and 11B depict a circular opening 3, a person of skill in the art will appreciate that opening 3 may be of different shapes as in the previously described embodiments, for example, may be oblong, square or elliptical.

In the embodiment illustrated in FIGS. 11A and 11B, side portions 4 are planar and have windows 4' defined therein. Windows 4' provide a better view of the housing area 6 defined in the interior of support collar 1 and improve the access to housing area 6 by an operator. Further, windows 4' make support collar 1 lighter and reduce material consumption when support collar 1 is molded from a plastic material. A person of skill in the art will appreciate, however, that in certain instances it may be desirable to have smaller or no openings 4', for example, when an increased strength of support collar 1 is desired. Therefore, in different embodiments of the invention, side portions 4 may have no windows 4' defined therein. Sill in different embodiments of the invention, side portions 4 may have a curvilinear shape, for example, an arched shape or a S-shape, rather than a planar shape.

A retaining clip 7 is provided in the interior of support collar 1 and is formed by a plurality of retaining arms 7' that extend inwardly into the interior of support collar 1. In one embodiment, retaining arms 7' extend from an attachment edge 2' of head portion 2, at the junction with a side portion 4. In other embodiments, however, retaining arms 7' may extend from an inner area of head portion 2 or from inner areas of side portions 4. In still other embodiments, retaining arms may extend from abutment portions 9 or from edges thereof. The purpose of retaining arms 7' is to engage an elongated body 13, such as a cable or a pipe, as shown in FIG. 12 and as will be discussed in greater detail later. To that end, retaining arms 7' are flexibly connected to frame 1' to spread for receiving, and reapproach for engaging, elongated body 13.

In one embodiment, attachment lines 2" of retaining arms 7' to attachment edges 2' are thicker than the surrounding areas (for example, thicker than head portion 2) so as to increase the grip of retaining arms 7' on elongated body 13. In particular, the thickening of attachment lines 2" is configured to cause retaining arms 7' to be rotatable in relation to head portion 2 but rigid in relation to side portions 4.

In another embodiment, in which head portion 2 is thicker that a remainder of frame 1', the increased thickness of head portion 2 carries into attachment edges 2', causing a similar effect as having thicker attachment lines 2".

In still another embodiment, the entire junction line between head portion 2 and side portion 4 is thicker than a remainder of frame 1'.

In one embodiment, ribs 7'" are defined on all or a portion of retaining arms 7' and on attachment lines 2" to increase the grip of retaining arms 7' on elongated body 13 by decreasing the flexibility of retaining arms 7'. It can be seen from FIGS. 11A, 11B and 12 that ribs 7'" may extend along the first, upper segments 7a of retaining arms 7' and wrap over the attachment line 2" connecting retaining arms 7' to head portion 2. In other embodiments, however, ribs 7'" may extend around attachment lines 2" and along all of first segments 7a or along longer or shorter portions of retaining arms 7'. It should be noted that ribs 7'" may be present on support collar 1 regardless of whether the above-described thickened area are present or not, in particular, regardless of whether head portion 2 and attachment lines 2" are thickened or not.

In one embodiment, windows 4' defined within side portion 4 are of the same width or wider than retaining arms 7', defining gaps 2'" between outer edges of retaining arm 7' and the adjacent edges of window 4'. In one embodiment, such gaps 2'" (measured in a perpendicular direction to the opposing edges of retaining arms 7' and window 4') are as small as practically possible, in order to maximize the width of retaining arms 7' and increase their strength, further increasing the grip on elongated body 13. In other embodiments, however, gaps 2'" of different widths may be defined between the edges of retaining arms 7' and the adjacent edges of window 4'.

In the embodiment illustrated in FIGS. 11A and 11B, retaining arms 7' include three segments: a first, upper segment 7a, extending from attachment line 2"; a second, middle segment 7b; and a third, lower segment 7c. By being shaped to have three segments, the construction of retaining arms 7' in this embodiment is similar to the construction illustrated in the embodiments depicted in the preceding figures.

In particular, first segments 7a of opposing retaining arms 7' are arranged to face each other in a "V" arrangement. In one embodiment, the opposing first segments 7a are inclined as much as practically possible in relation to one another (in other words, the opposing arms of the "V" are as divergent as possible) in order to provide a strong grip even on elongated bodies 13 of small diameter while maintaining a relatively limited height of side portions 4.

More particularly, having a support collar 1 as low as possible (that is, with side portions 4 as short as possible) is highly desirable. A low support collar 1 not only requires less material to produce but, more importantly, a stack of support collars one on top of the other is less sensitive to a force applied laterally to the stack, for example, due to the impact of wind when support collars 1 are used to house cables in telephone towers.

In one embodiment, first segments 7a have themselves a "V" shape defined by sub-segments 7a' and 7a" (see FIG. 11B) so as to further increase the grip of retaining arms 7' on elongated body 13. In particular, sub-segments 7a' and 7a" may be arranged as a "V" having its arms spread apart as little as practically possible, especially when support collar 1 is configured for holding elongated bodies 13 of smaller diameter, so as to increase grip on elongated body 13 and lower the overall height of support collar 1. For example, the angle between the arms of the "V" defined by first segments 7a may be less than 120 degrees. In one embodiment, rib 7'" is defined only on upper sub-segment 7a', as shown in FIG. 12.

Second segment 7b has an arched configuration with a concavity facing a central portion of housing area 6, so that opposing second segments 7b of opposing retaining arms 7' define a seat for receiving elongated body 13. A person of skill in the art will appreciate that second segments 7b are dimensioned according to the diameter of elongated body 13 to be received. In one embodiment (not shown), the arcs defining second segments 7b extend beyond the attachment point to first segment 7a, so as to increase the contact area with elongated body 13 in an upper portion of housing area 6. Such extensions, however, may not be desirable because those extensions may interfere with the bottom portions 5'" of coupling portions 5 of a second supports collar 12 stacked on top of support collar 1 as shown in FIG. 12. Moreover, those optional extensions may reduce the ability of using support collar 1 for elongated bodies of different diameters because those extension limit the grip on an elongated body having a diameter larger than the nominal diameter of clip 7. Experiments by Applicant have shown that the illustrated configuration of second segments 7b, without such extensions, generates both a strong grip on elongated body 13 and an increased ability to stack a plurality of support collars.

Figure 13:
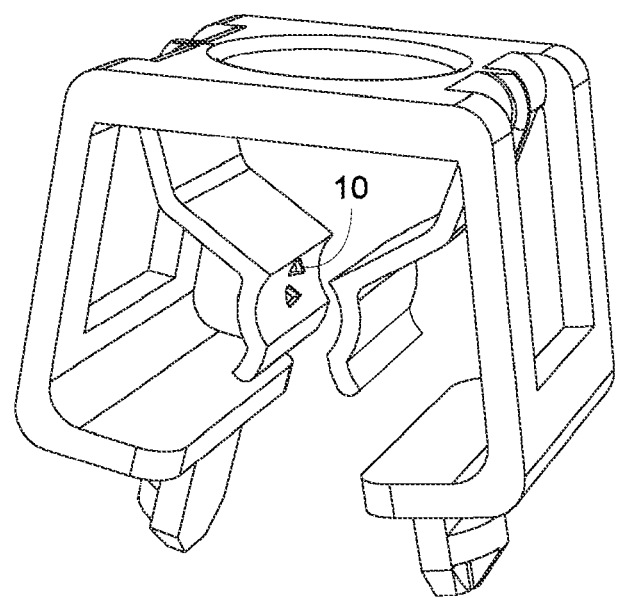
FIGS. 13 and 14 are perspective views of a support collar similar to the embodiment depicted in FIGS. 11A and 11B, with the addition of contact elements.
Figure 14:
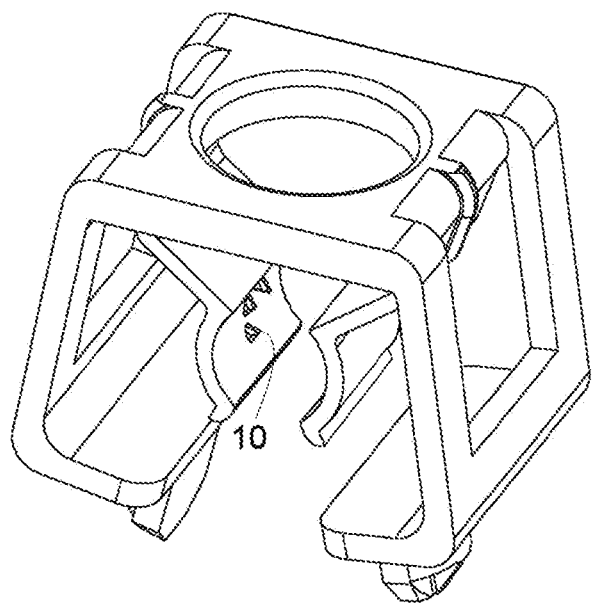
Figure 15:
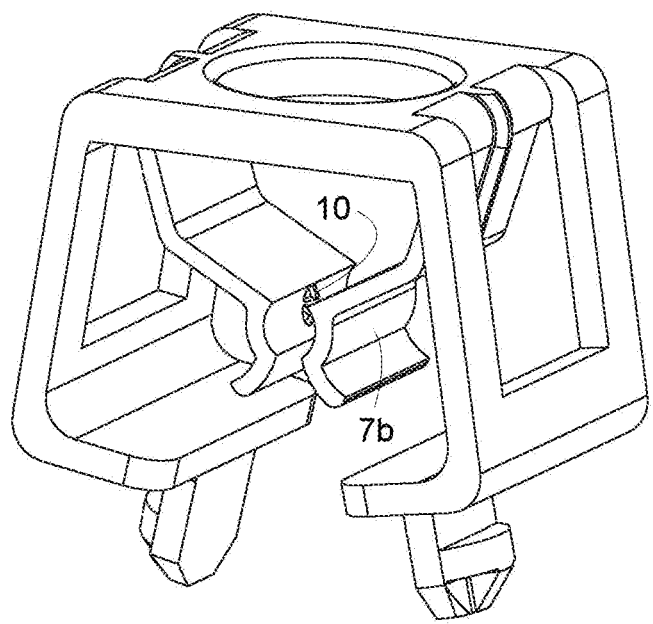
Figure 16A:
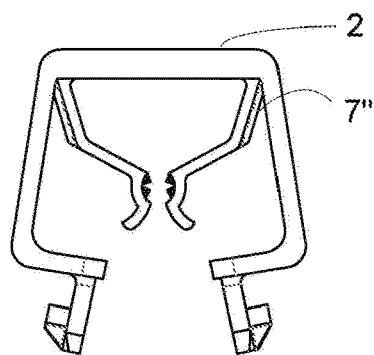
Figure 16B:
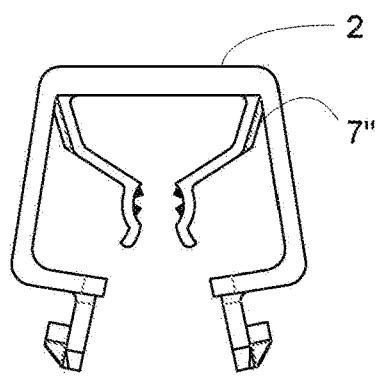
Figure 16C:
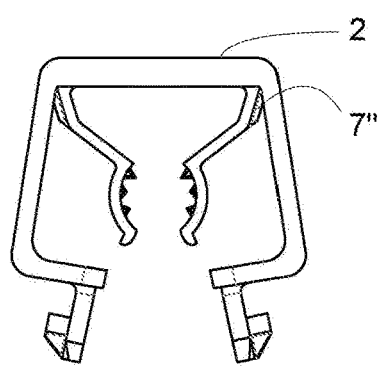
Figure 16D:
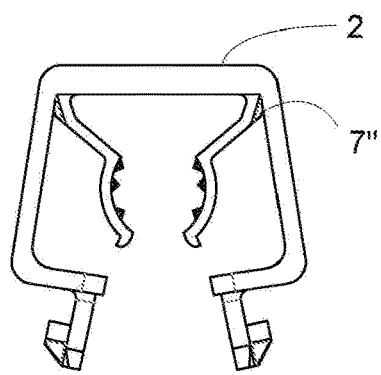
Figure 18:
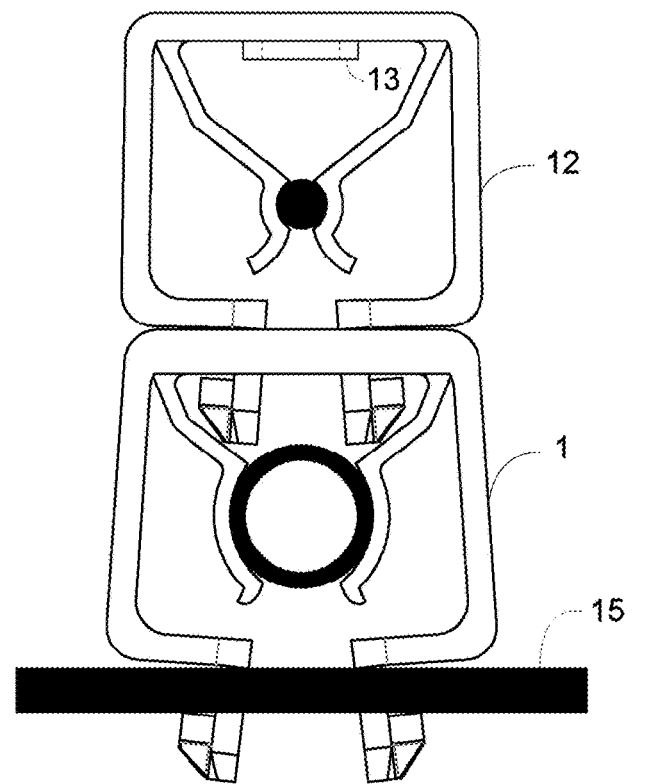
FIG. 18 is a front view of two stacked support collars constructed according to the embodiments of FIGS. 11A and 13, stacked on top of each other and engaged to a support plate.
Figure 19:
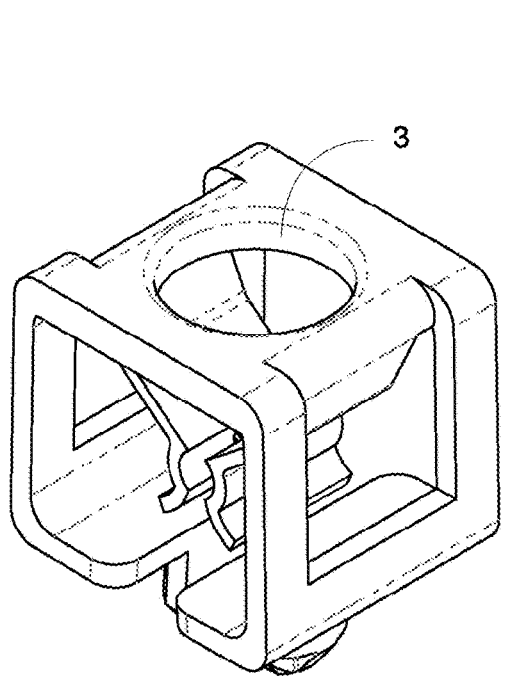
FIG. 19 is a perspective view of a support collar constructed according to the principles of the embodiment of FIG. 13.
Figure 20:
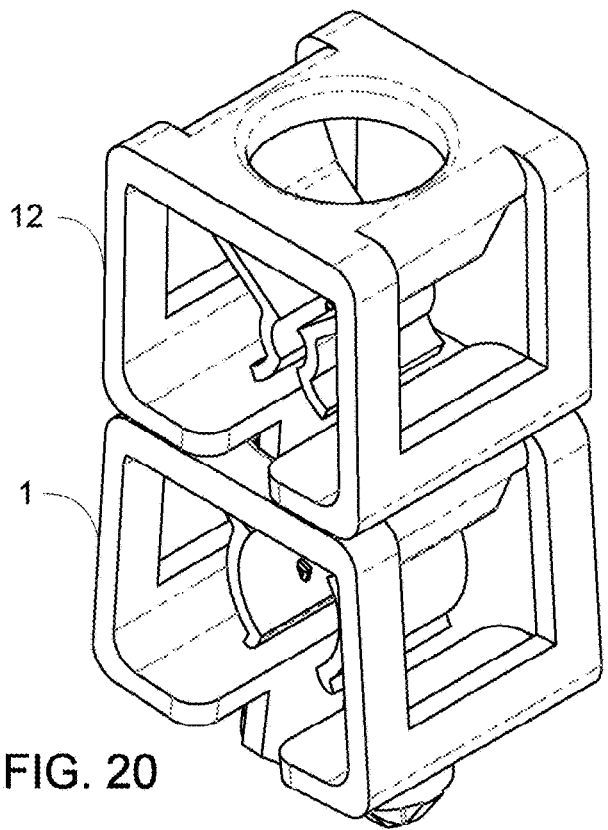
FIG. 20 is a perspective view of two stacked support collars constructed according to the principles of the embodiments depicted in FIGS. 11A and 13.

In one embodiment, retaining blades 10 are provided on the inner faces of second segments 7b to further increase the grip on an elongated body 13 such as a cable. Retaining blades 10 may be in different numbers and be of different shapes, for example, may be triangular with the apex pointing into the space between second segments 7b (see, e.g., FIGS. 13-15) or have alternative shapes, as discussed in regard to the preceding embodiment. Further, different numbers of retaining blades 10 may be provided on the inner side of each second segment 7b, from one to a number as high as practically possible. For example, FIG. 14 depicts an embodiment with three retaining blades 10 on each inner side of second segments 7b while FIG. 15 shows an embodiment with two retaining blades.

Third segments 7c are shaped as winglets that extend downwardly and outwardly from second segments 7b, in directions opposite to those of first segments 7a, and facilitate the entry of elongated body 13 into clip 7 and into the seat defined by opposing second segments 7b due to the outward inclination of third segments 7c. Third segments 7c may have different lengths, shapes and inclinations, for example, may be curvilinear or straight.

FIG. 12 depicts two different embodiments, in which retaining collar 12 has third segments 7c that are curvilinear and extend outwardly while retaining collar 1 has second segments 7c that each have a comma-shaped elongation with one curvilinear wall and one straight wall. A person of skill in the art will appreciate, however, that other shapes and elongations of third segments 7c are possible. Some examples of those alternative shapes and elongations were discussed in regard to the preceding embodiments.

In the above-described embodiments, support collar 1 may be produced from different materials. In one embodiment, support collar 1 is made of a plastic material, so as to reduce PIM, a type of interference in cell phone towers that reduces a cell's receive sensitivity. A few examples of plastic materials that may be employed were discussed in regard to the preceding embodiments but a person of skill in the art will appreciate that a wide range of plastic materials, with and without reinforcements, may be employed.

Due to the above-described features, a support collar according to the invention made from plastic achieves a retaining load on an elongated element such as a cable that is higher than, or comparable to, plastic retaining collars in the prior art, and also comparable to the retaining load of steel support collars, but without the drawbacks deriving from PIM and the shape limitations inherent in metal stamping.

Moreover, a support collar according to the invention enables the construction of lower stacks of support collars than would be possible with the same number of support collars in the prior art, thereby reducing the impact of wind load on the stack and the danger of a detachment of the stack from a support plate.

FIGS. 15-20 depict different embodiments of a support collar according to the invention, shaped to receive elongated bodies such as cables having different diameters.

In the present description, "substantially" indicates a possible deviation of ±20%, and "a" means "one or more" unless stated otherwise.

While the invention has been described in connection with the above-described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

The invention claimed is:

1. A support collar for an elongated body, comprising:
   a frame comprising,
      a head portion having an opening therethrough,
      a plurality of side portions extending downwardly from the head portion, and
      a plurality of abutment portions each extending transversely from one of the side portions,
      wherein the plurality of side portions are flexibly connected to the head portion, so as to be capable of approaching or spreading away from each other, and
      wherein the head portion, the plurality of side portions, and the plurality of abutment portions define a housing area;
   a plurality of coupling portions, each extending downwardly from one of the abutment portions, each of the coupling portion being configured to engage the support collar to a support plate or to an additional support collar; and
   retaining means disposed within the housing area to retain the elongated body therein,
   wherein the retaining means comprise a clip having retaining arms that extend into the housing area, the retaining arms being flexibly connected to the frame to spread for receiving, and to reapproach for engaging, the elongated body within the housing area, each of the retaining arms comprising,
      a first segment that extends from a respective attachment edge of the frame into the housing area and defines a V-shape that is disposed in an interior of the housing area and has sides diverging toward the interior of the housing area,
      a second segment that extends from the first segment and defines a concavity facing a central portion of the housing area, opposing concavities defining a seat configured to receive the elongated body, and
      a third segment that extends from the second segment outwardly toward the frame, each third segment being configured as a winglet that is rectilinear or arched to facilitate entry of the elongated body into the seat defined by an opposing second segment,
   wherein, on each side of the head portion, a rib extends longitudinally from the attachment edge of the first segment to the frame along at least a portion of one of the retaining arms, and
   wherein an entirety of the attachment edge is thicker than a portion of the first segment where no rib is present.

2. The support collar according to claim 1, wherein the at least a portion of the each of the retaining arms is at least a portion of the first segment of the each of the retaining arms.

3. The support collar according to claim 2, wherein the at least a portion of the first segment is a branch of the V-shape defined by the first segment of the each of the retaining arms.

4. The support collar according to claim 1, wherein the retaining arms are connected to the head portion by the attachment edge.

5. The support collar according to claim 1, wherein an edge of the frame, along a portion of which the first segment extends, is thicker than a portion of the first segment where no rib is present.

6. The support collar according to claim 1, wherein the head portion is thicker than the side portions and/or the abutment portions.

7. The support collar according to claim 1, further comprising a lip extending from the head portion, the lip providing an increased contact area between the head portion and coupling portions of the additional support collar.

8. The support collar according to claim 1, wherein the side portions have windows defined therein, each window being at least as wide as each of the retaining arms.

9. The support collar according to claim 8, wherein a perpendicular gap is defined perpendicularly between a side edge of each window and a side edge of an adjacent first segment.

10. The support collar according to claim 8, wherein no gap is defined perpendicularly between a side edge of each window and a side edge of an adjacent first segment.

11. The support collar according to claim 1, wherein the side portions have a planar shape.

12. The support collar according to claim 1, wherein branches of the V-shape defined by the first segment are spread by no more than 120 degrees.

13. The support collar according to claim 1, further comprising one or more retaining blades extending from each concavity toward the central portion of the housing area.

14. The support collar according to claim 1, wherein the support collar is made from a plastic material.

\* \* \* \* \*